United States Patent
Rice et al.

[19]

[11] Patent Number: 5,949,066

[45] Date of Patent: Sep. 7, 1999

[54] SYSTEM AND METHOD FOR CREATING AND UTILIZING A SINUSOIDAL BASED PATTERN SENSOR TO ACHIEVE PRECISE POSITIONING OF A MOVABLE ELEMENT

[75] Inventors: James Patrick Rice; David Martin Perry, both of Lafayette; Curtis Alan Shuman, Colorado Springs; Peter Joseph Van Laanen, Boulder, all of Colo.

[73] Assignee: O.R. Technology, Inc., Boulder, Colo.

[21] Appl. No.: 08/805,108

[22] Filed: Feb. 24, 1997

[51] Int. Cl.⁶ .............................. G01D 5/34; G11B 7/00
[52] U.S. Cl. .................... 250/231.13; 250/231.16; 369/109
[58] Field of Search .................. 250/231.16, 231.13, 250/214 PR, 237 G; 369/109, 110

[56] References Cited

U.S. PATENT DOCUMENTS

| | | |
|---|---|---|
| 4,570,191 | 2/1986 | Di Stefano et al. . |
| 4,633,451 | 12/1986 | Ahn et al. . |
| 5,120,927 | 6/1992 | Williams et al. . |
| 5,121,371 | 6/1992 | Fransworth et al. . |
| 5,563,868 | 10/1996 | Fransworth et al. . |
| 5,636,025 | 6/1997 | Bieman et al. ............ 250/237 G |

OTHER PUBLICATIONS

Stephen W. Farnsworth, & Scott D. Wilson, Diffractive Optical System For Tracking On Floptical® Disks SPIE vol. 1690 Design of Optical Instruments (1992), 72–79.

*Primary Examiner*—Edward P. Westin
*Assistant Examiner*—Kevin Pyo
*Attorney, Agent, or Firm*—Thomas E. Schatzel; Law Offices of Thomas E. Schatzel A Prof. Corp.

[57] ABSTRACT

A position sensor and a method of creating the same which sensor has an incoherent light source, multiple light detectors and a sinusoidal pattern that can be directly installed to the sensor. The light source and detectors are positioned along the axis of motion of the element whose position is to be determined. In a device containing such a movable target element, light from the sensor is directed through the sinusoidal pattern to and reflected from a periodic reflection profile to create detectable sinusoid signals that can be used for positioning purposes.

34 Claims, 5 Drawing Sheets

SYSTEM AND METHOD FOR CREATING AND UTILIZING A SINUSOIDAL BASED PATTERN SENSOR TO ACHIEVE PRECISE POSITIONING OF A MOVABLE ELEMENT

FIELD OF THE INVENTION

This invention generally relates to improvements in means and methods for precisely positioning elements in a device such as an information storage system, particularly wherein precise positioning of the appropriate elements is achieved through the use of a sinusoidal intensity pattern and a conventional light source.

BACKGROUND OF THE INVENTION

The continuing emphasis in modern storage systems is on providing the capability to store increasing amounts of information in newer versions of desktop and laptop computers as they become available. Thus, it is not unusual to find current computers with installed hard drives capacities in excess of 500 megabytes and, in some instances, a gigabyte or more. That amount of storage is needed to hold the usual complement of very large operating system and application programs in use today and still leave room for data files, sound files, click art and utility programs, as well as virtual storage capability. When the storage demands of data, graphic, video and sound files are added to the cumulative space taken up by the operating system and a user's application and utility programs, it is understandable that such large storage devices are needed.

The difficulty with such hard drives is that the overwhelming majority of them are non-removable. When a user wants to transport a large number of files to another system not directly coupled to or on the same network as the source computer, the only way to do so was through use of a large number of 3.5 inch, 1.44 megabyte capacity floppy diskettes, which remains the default removable media for most desktop and laptop suppliers and users in use today. Within the last few years, high capacity magnetic and optical drives and media therefor became available so that those who were able to utilize such devices could transfer a significant number of large files to a single media having capacities of many megabytes for backup purposes and/or use in a remote computer system.

Available as internal or external to the computer system they served, these added high capacity devices were helpful, but still not an optimum solution for transporting large amounts of information since they were, in fact, a supplemental device that was usually purchased in the aftermarket, required its own space and had to be easily installed by the user. In addition, such high capacity drives only accepted a special ultra high density media, not the common 3.5 inch, 1.44 megabyte floppy diskette.

One solution to the problems posed by the high capacity drives is the a:drive from OR Technology Inc. of Campbell, Calif. While its outward appearance is almost indistinguishable from that of 3.5 inch, 1.44 megabyte floppy diskette drives, the a:drive provides 120 megabytes of storage on ultra high density diskettes, known as LS-120 media. At the same time, the a:drive product is compatible with current and legacy 3.5 inch technology and can read and write to both 720 kilobyte and 1.44 megabyte diskettes. As its name implies, the a:drive can serve as a bootable drive in any system in which it is installed.

Employing a precision positioning system for accurately driving an optically based dual-gap head that accommodates the differing track densities of conventional and ultra high density diskettes without error or mishap, the a:drive fits into the one inch height spacing occupied by 3.5 inch media drives. It also uses the same cable as the systems hard drive and so can readily serve a dual information storage role without impacting the recent emphasis on reducing size and weight while simultaneously requiring dual storage capability has impacted devices such as the a:drive. The push to a one-half inch height, low profile configuration for diskette drives has created size restrictions and other requirements that cannot be met by currently available head positioning mechanisms and space consuming optical sensing arrangements. A desire to make the newer devices more compact effective as well as more cost effective has forced designers to change or abandon prior positioning systems in search of substitutes that are as accurate, smaller and more economical.

SUMMARY OF THE INVENTION

It is, therefore a primary object of the present invention to provide a sensor for accurately and effectively positioning the read/write head assemblies of a dual media, low profile floppy disk drive.

It is an additional object of the present invention using that sensor to achieve such accurate head positioning in a cost effective manner.

It is a further object of the present invention to provide an accurate positioning sensor for any device requiring the same, which sensor utilizes a predetermined sinusoidal pattern to help achieve the required positioning precision.

In accordance with the present invention, a position sensor having a conventional light source, multiple light detectors and a sinusoidal pattern that can be directly installed to the sensor are employed to develop quadrature measurement signals. The light source and detectors are positioned along the axis of motion of the element whose position is to be determined. In a device containing such a movable target element, light from the sensor is directed through the sinusoidal pattern to and reflected from a periodic reflection profile to create detectable sinusoid signals that can be used for positioning purposes. A method of making and using an optical sensor in accordance with the present invention is also described.

The invention has the following advantages over prior optical tracking systems.

A sinusoidal pattern is joined to a light source and light detectors to form an optical sensor that provides quadrature signals in a cost effective and space saving manner. The sinusoidal pattern has two segments of the same spatial frequency with the two segments adapted so that the second segment is out of phase with the first segment.

In the invention, the sensor does not use or rely on the interference properties of light and thereby avoids the problems and costs associated with sensors that do. Instead, a relatively inexpensive incoherent light source which emits light that is independent of the angle from which it is viewed can be used. This light source is employed in place of a coherent source, such as a laser diode. A laser diode will also work in place of the incoherent light source. The optical sensor of the invention does not require a lens and the source and its associated detecting components can be effectively positioned within a device, such as a disk storage drive, in a more compact manner than prior and more conventional optical sensing arrangements.

DESCRIPTION OF THE PREFERRED EMBODIMENT

Figure 1:
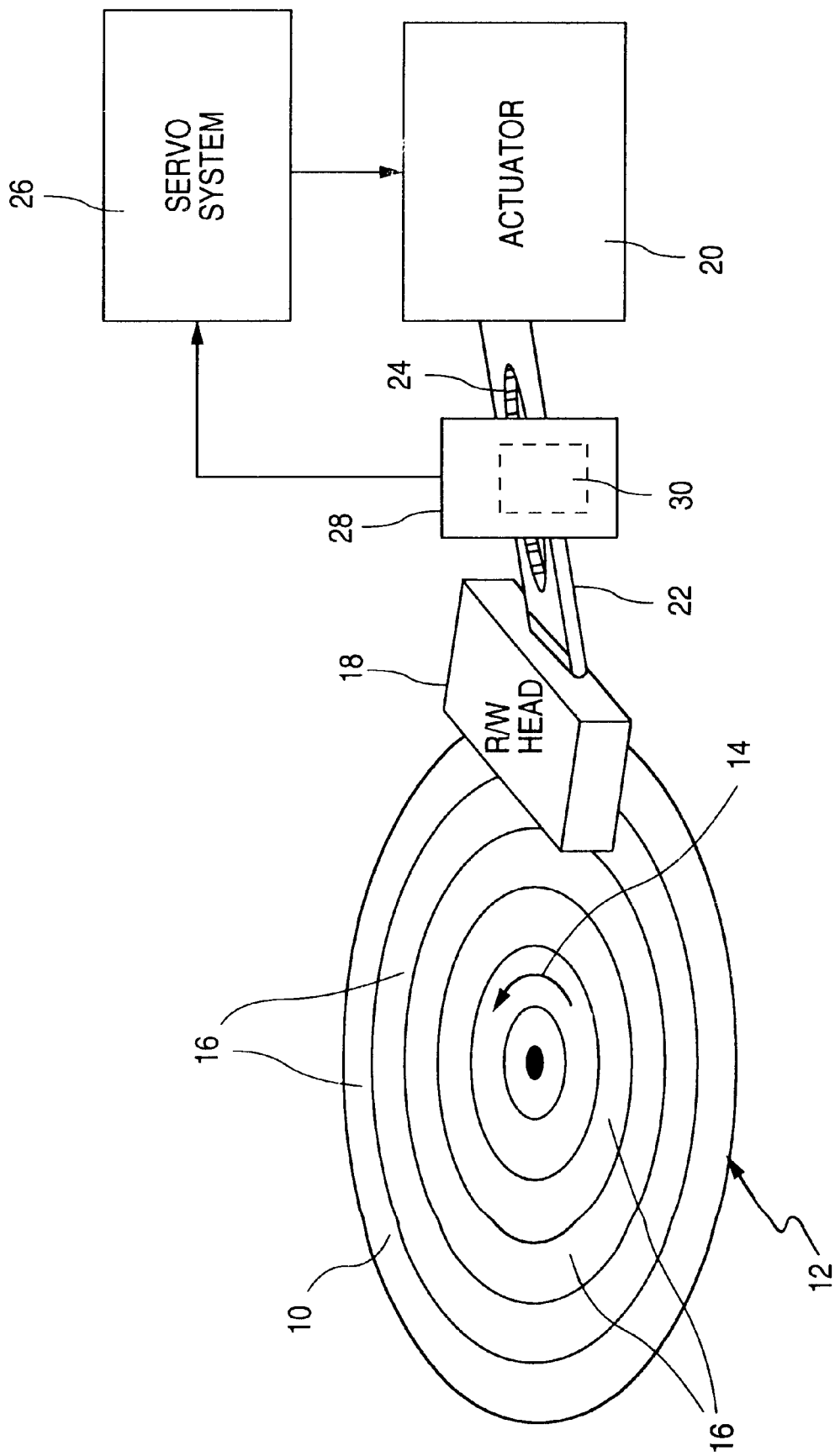
FIG. 1 depicts a disk storage system and an optical tracking system in accordance with the present invention.

FIG. 1 shows a dual media disk storage system for reading data from and writing data to the surface 10 of removable magnetic media 12 having an axis of rotation 14 and a plurality of concentric data tracks 16. Although the disk drive system is capable of handling dual media, in this instance, for the sake of clarity, only one disk is shown, the well known 3.5 high density type that holds 1.44 megabytes when formatted.

A read/write head 18 is driven by an actuator 20 and actuator arm 22 which positions the read/write head 18 over a desired track 16 on the surface 10 of disk 12. The actuator arm 22 carries a strip having a periodic reflection profile 24 which is used in this instance because the 3.5 family of diskettes do not carry any location markings on their surface. In this embodiment, the periodic reflection profile is a linear encoder. Actuator 20 is under control of a conventional, closed loop servo system 28 which is responsive to a signal from an optical sensor 30 mounted on the underside of sensor housing 28.

Figure 2:
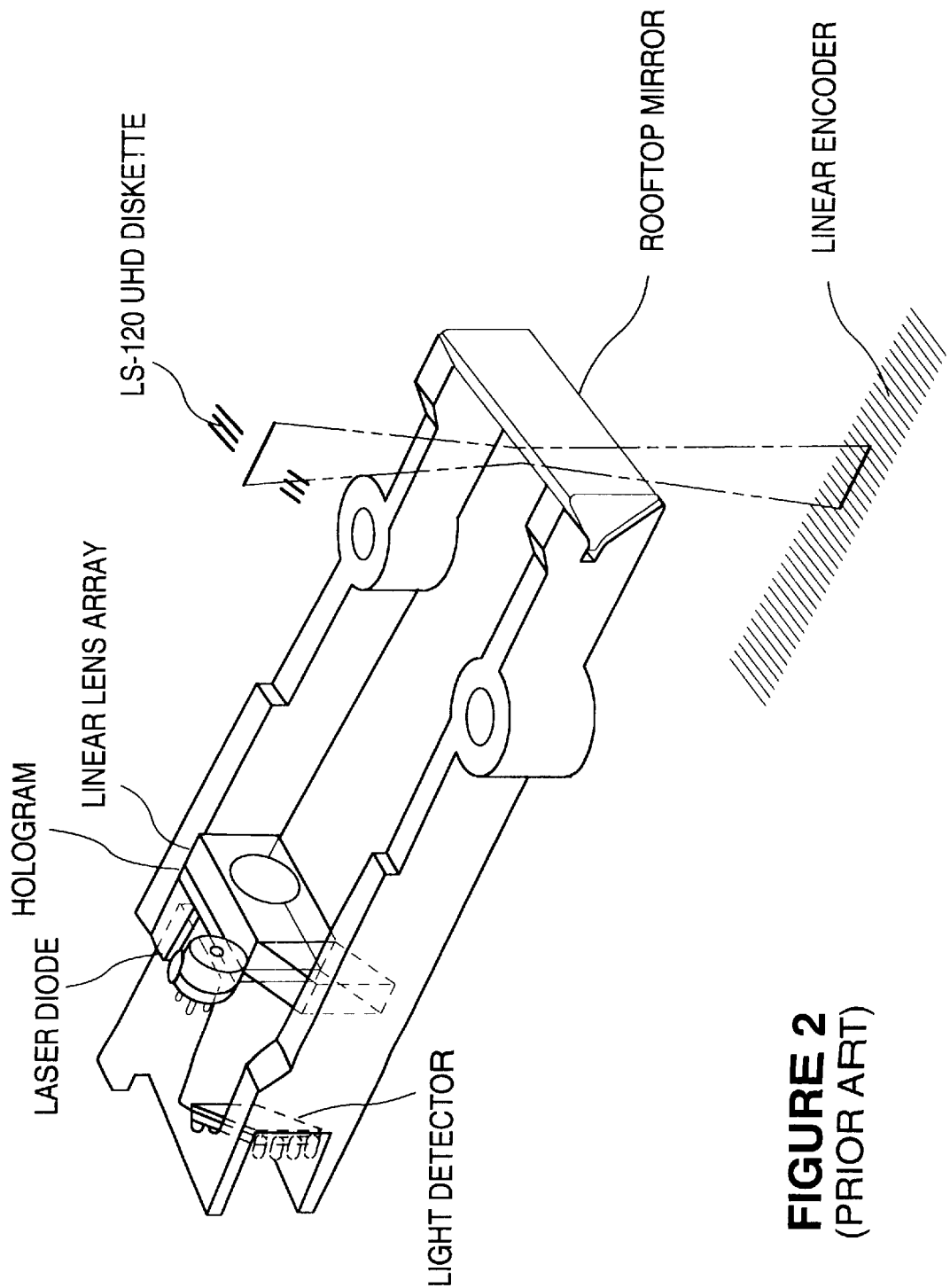
FIG. 2 illustrates a prior art optical positioning system.

Typically, prior art versions of this type of dual media disk drives used a split beam arrangement, as shown in FIG. 2, to derive signals to accurately position their read/write heads. As evident from the FIG. 2 arrangement, the vertical spacing required by such prior art systems would not fit in a disk drive that was going to be half as high. Thus, a change in the optical sensing system in accordance with the present invention was made in order to accommodate the more stringent drive height requirement.

Figure 3:
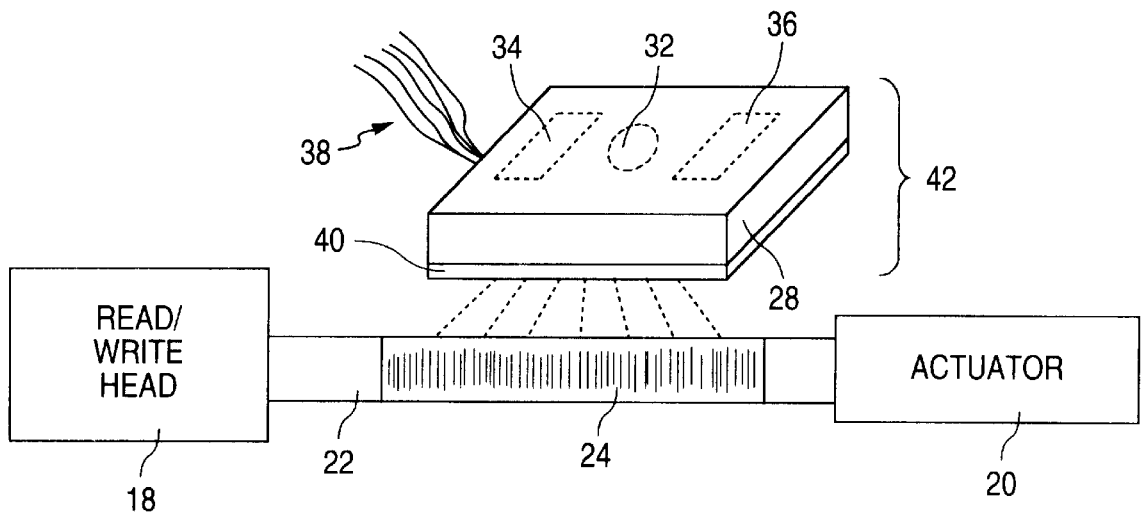
FIG. 3 shows a side view of an optical sensor according to the present invention as utilized in a dual media disk drive.

The improved arrangement is shown in FIG. 3 where the periodic reflection profile 24 is enlarged for the sake of illustration. The encoder lines are uniform and, in the preferred embodiment, have a width of 20.4 micrometers. The lines are spaced apart at intervals of 40.8 micrometers so that profile 24 has a duty cycle of 50%, half reflective and half clear. The duty cycle of a profile is set by the design parameters of a particular disk drive and does not form a part of the present invention except to the extent that a profile can be used as specified herein. The actual pitch or line separation of profile 24 is a matter of design choice and does not play a role in the present invention except as specifically noted hereinafter.

Figure 4:
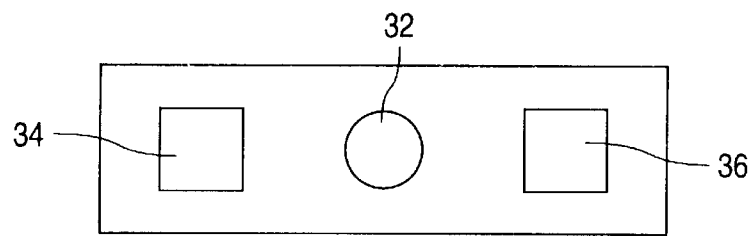
FIG. 4 is a bottom view of the of an optical sensor according to the present invention shown without a sinusoidal pattern joined thereto.

The optical sensor housing 28 holds a light emitting diode or LED 32, a first light detector 34 and a second light detector 36. LED 32 and detectors 34 and 36 are aligned along the axis of motion of actuator arm 22 as shown in FIG. 3. A bundle of leads 38 is provided and internally connected to carry power to and signals from sensor 42. A bottom view of sensor housing 28 in FIG. 4 shows the relative positioning of the LED 32 and detectors 34 and 36 in housing 28.

It should be noted that the alignment of LED 32 and detectors 34 and 36 can be changed to be transverse to the direction of motion or that the LED and detectors can be placed in other locations in order to satisfy different space and design considerations. More specifically, aligning the detectors on center or coaxially, without regard to the position of the light source, minimizes or totally negates azimuthal errors. Positioning the light source colinearly with the detectors minimizes or eliminates roll errors. These compensating placements for azimuth and roll errors are independent of each other.

It should also be noted that a light emitting diode, LED 32, is used in the present embodiment for cost purposes. It provides an economical source of light which works well in the preferred embodiment. However, any other back illuminated source of light or a laser diode will function just effectively.

Figure 5:
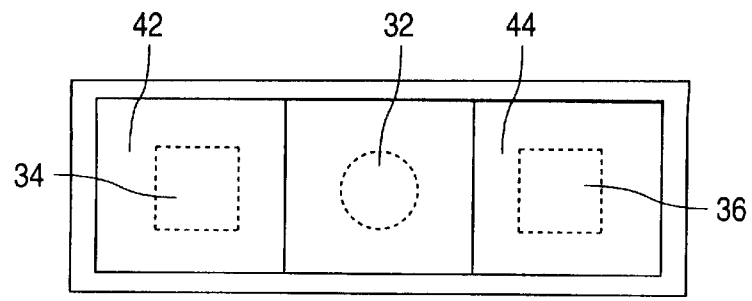
FIG. 5 is a bottom view of the of an optical sensor according to the present invention shown with a sinusoidal pattern joined thereto.

Sensor 42 also includes a sinusoidal pattern or grating 40 which is directly joined to the bottom of sensor housing 28 as depicted in FIG. 5. The sinusoidal pattern 40 includes two discrete segments 42 and 44 which each comprise a continuous tone that varies sinusoidally in intensity along its length; that is, in the direction of motion of actuator arm 22. It is important to note that segments 42 and 44 are arranged to be 90 degrees out of spatial phase with each other. This means that the start of segment 44 is shifted by 90 degrees opposite to the direction of motion from the start of segment 42. While only two sinusoidal segment patterns are used in the preferred embodiment, it may be appropriate to use more than two such segments in another design.

Figure 6:
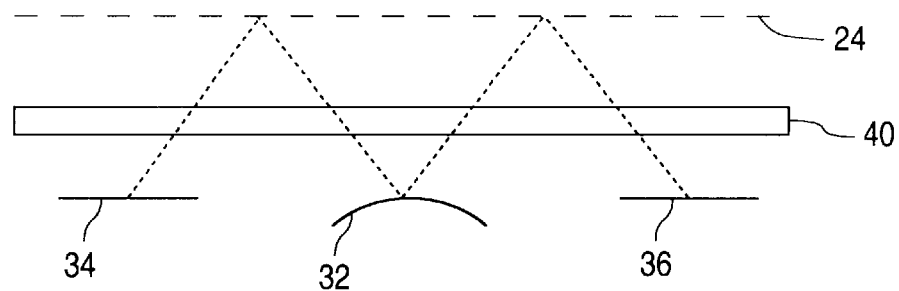
FIG. 6 is a schematic view of incident light travel between a light source, a target profile having a discrete spatial frequency and light detectors, through a sinusoidal pattern, all in accordance with the present invention.

Light from LED 32 passes through sine grating 40 and impinges the periodic refection profile 24. Some of that light is reflected back to detectors 34 and 36, as a function of the duty cycle of profile 24, passing though the sine grating 40 a second time. This is illustrated in FIG. 6.

Figure 7:
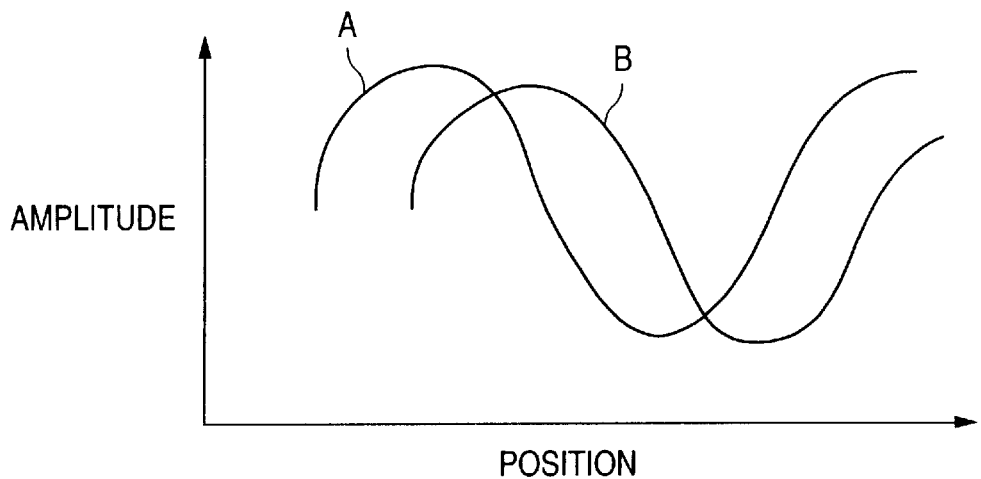
FIG. 7 graphically shows the incident light signals developed by the light detectors plotted against position.

The returning light, after passing through sine grating 40, impinges upon detectors 34 and 36. Detector 34 responsively develops sinusoidal signal A and detector 36 responsively develops sinusoidal signal B. These two signals are 90 degrees out of phase with each other as a result of the phase differential between grating segments Signals A and B are shown in FIG. 7 with the amplitude of both plotted against position.

Figure 8:
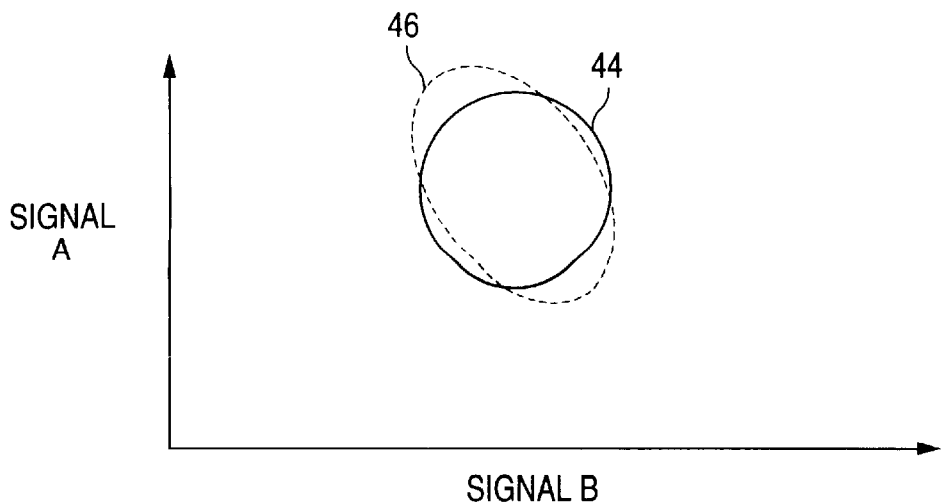
FIG. 8 graphically shows the incident light signals developed by the light detectors plotted against themselves.

FIG. 8 shows signals A and B plotted against themselves. If they are truly 90 degrees out of phase with each other, their plot is a perfect circle 44 as depicted in FIG. 8. If the two signals do not emerge from the sensor in true quadrature relationship, circle becomes an ellipse 46 and accurate positioning of read/write head 18 becomes more difficult to accurately position.

In the preferred embodiment, it has been found that the response of sensor 42 can be optimized and its resolution maximized where incident light travels through the sinusoidal grating twice if the spatial frequency or pitch present in periodic reflection profile 24 is one half that of the sine grating segments 42 and 44. Moreover, it has been determined that harmonic components otherwise resulting in the sensor are greatly suppressed because each harmonic's coefficient of attenuation is squared when the incident light passes through the sine grating twice. This is particularly true, as in this instance, where the sinusoidal pattern is designed to have dominant modulation at a single spatial frequency. As a result, the significance of the dominant frequency is enhanced in sensor 42.

Figure 9:
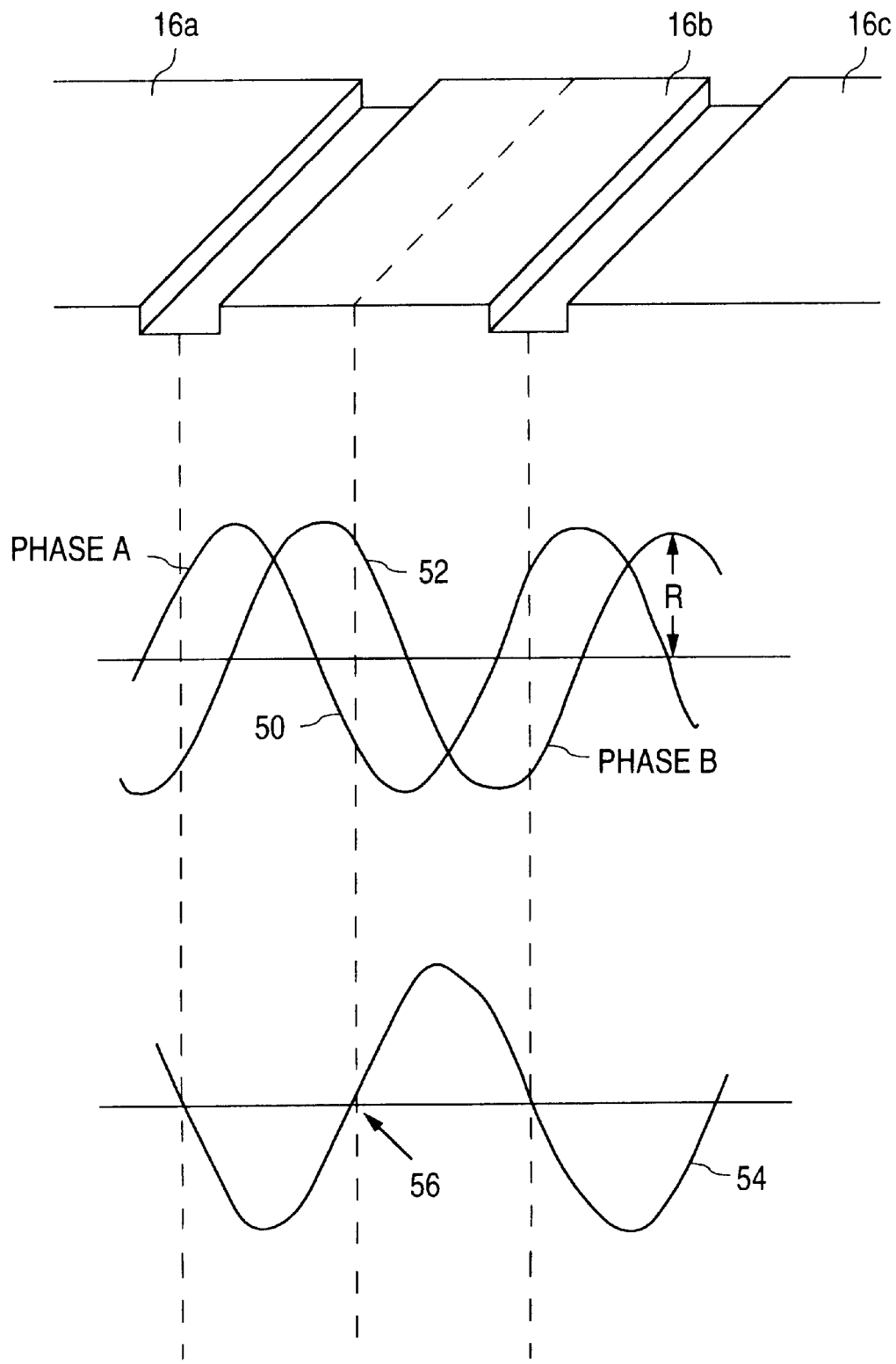
FIG. 9 is a schematic representation of how the signals developed by the light detectors in accordance with the present invention are used to precisely position the read/write head of a disk drive.

In operation, the disk drive's servo system 26 receives a signal from the operating system of the computer to which it is attached indicating that a particular track of the diskette it holds is to be read from or written to. In order for that to happen, read/write head 18 must be moved to the appropriate location over the specified track. Consequently, the servo system issues an appropriate signal to actuator 20 and arm 22 that will drive them from their current known position to the destination track. As illustrated in FIG. 9, a reference position is assumed to be at point "X", in the center point between adjacent tracks 16. The center of read/write head 18 is determined to be at a displacement "D" from X. The distance from D to the intended destination point, at the center point of track 16b, is deemed to be "REF" (for reference) degrees. Then, "φ" represents the spatial angle that must be brought to zero by servo system 26 to reposition read/write head 18 at the desired final location, centered over track 16b.

The signals from detectors 34 and 36 are used respectively to represent Phase A and Phase B of the incident light returned from the periodic reflection profile 24. "R" is the amplitude of the Phase A and Phase B waveforms. In FIG. 9, they are identified by reference characters R, 50 and 52 respectively.

It is known that:

Phase A=R*Sin(φ) and Phase B=R*Cos(φ)

where φ=[d/20.4 μm]*360 degrees and

R=Sin(REF−φ)=R*Sin(REF)*Cos(φ)−R*Cos(REF) Sin(φ)

If REF is determined to be equal to 115 spatial degrees, then the Composite Error CE (reference numeral 54 in FIG. 9) is determined as follows:

CE=R*Sin(115−φ) or

CE=Sin(115)*Phase B−Cos(115)*Phase A

The idea is to drive CE to zero, which occurs at point 56 in FIG. 9. The read/write head 18 will be centered over track 16b when that occurs as a result of using sensor 42 as described.

Although the present invention has been described in terms of the presently preferred embodiments thereof, it is to be understood that the disclosure, its specific details, representative devices and illustrative examples are not intended to be nor should they be interpreted as limiting the present invention. Various alterations and modifications will become apparent to those skilled in the art after having read the foregoing disclosure. Accordingly, it is intended that the appended claims be interpreted as covering all alterations and modifications as fall within the true spirit and scope of the present invention.

Having thus described our invention, what we claim as new, and desire to secure by Letters Patent is:

1. A method of making an optical sensor for use in a device in which the sensor will serve to effect precise positioning of at least one movable item in the device, which method comprises the steps of:
   a) providing a back illuminating source of light;
   b) providing two light detectors;
   c) providing a surface with a periodic reflection profile on the movable item;
   d) installing a sinusoidal pattern between the periodic reflection profile and the light emitting diode and the detectors; and
   e) aligning the light source and the detectors so that the light source transmits light to reflect from the periodic refection profile back to the detectors through the sinusoidal pattern.

2. The method according to claim 1 wherein the sinusoidal pattern is installed directly to the light emitting diode and detectors so that light passes through the sinusoidal pattern twice before being detected.

3. The method according to claim 2 wherein the sinusoidal pattern used consists of a plurality of segments of the same frequency that are out of spatial phase with one another, and the alignment step comprises placing one of the segments in alignment with one of the detectors and the other segment in alignment with the other of the detectors.

4. The method according to claim 3 in which the alignment step comprises aligning the light source and the detectors along the axis of motion of the movable item.

5. The method according to claim 1 wherein the sinusoidal pattern used consists of a plurality of segments of the same frequency that are out of spatial phase with one another, and the alignment step comprises placing one of the segments in alignment with one of the detectors and the other segment in alignment with the other of the detectors.

6. The method according to claim 5 in which the alignment step comprises aligning the light source and the detectors along the axis of motion of the movable item.

7. The method according to claim 1 in which the alignment step comprises aligning the light source and the detectors along the axis of motion of the movable item.

8. The method according to claim 2 in which the alignment step comprises aligning the light source and the detectors along the axis of motion of the movable item.

9. A system having an optical sensor therein to effect precise positioning of at least one movable item in the system, which comprises:
   a) a back illuminating source of light;
   b) a plurality of light detectors;
   c) a periodic reflection profile on the movable item; and
   d) a sinusoidal pattern positioned between the periodic reflection profile and the light emitting diode and the detectors.

10. The system according to claim 9 wherein the light source and the detectors are positioned so that the light source transmits light to reflect from the periodic reflection profile back to the detectors through the sinusoidal pattern.

11. The system according to claim 10 wherein the sinusoidal pattern is installed directly to the light source and detectors so that light passes through the sinusoidal pattern twice before being detected.

12. The system according to claim 11 wherein the sinusoidal pattern has a first spatial frequency and the periodic reflection profile on the movable item has a second spatial frequency that is twice the first spatial frequency.

13. The system according to claim 12 in which the light source and the detectors are positioned along the axis of motion of the movable item.

14. The system according to claim 13 wherein the sinusoidal pattern consists of a plurality of segments of the same frequency that are out of spatial phase with one another, and the alignment step comprises placing one of the segments in alignment with one of the detectors and another segment in alignment with the other of the detectors.

15. The system according to claim 12 in which the light source is a light emitting diode.

16. The system according to claim 9 wherein the sinusoidal pattern is installed directly to the light source and detectors so that light passes through the sinusoidal pattern twice before being detected.

17. The system according to claim 16 wherein the periodic reflection profile on the movable item has a spatial frequency that is one half the spatial frequency of the sinusoidal pattern.

18. The system according to claim 17 in which the light source and the detectors are positioned along the axis of motion of the movable item.

19. The system according to claim 18 wherein the sinusoidal pattern consists of a plurality of segments of the same frequency that are out of spatial phase with one another, and the alignment step comprises placing one of the segments in alignment with one of the detectors and another of the segments in alignment with the other of the detectors.

20. The system according to claim 19 in which the light source is a light emitting diode.

21. The system according to claim 9 wherein the periodic reflection profile on the movable item has a spatial frequency that is one half the spatial frequency of the sinusoidal pattern.

22. The system according to claim 21 in which the light source and the detectors are positioned along the axis of motion of the movable item.

23. The system according to claim 22 wherein the sinusoidal pattern consists of a plurality of segments of the same frequency that are out of spatial phase with one another, and the alignment step comprises placing one of the segments in alignment with one of the detectors and another of the segments in alignment with the other of the detectors.

24. The system according to claim 23 in which the light source is a light emitting diode.

25. The system according to claim 9 in which the light source and the detectors are positioned along the axis of motion of the movable item.

26. The system according to claim 25 wherein the sinusoidal pattern consists of a plurality of segments of the same frequency that are out of spatial phase with one another, and the alignment step comprises placing one of the segments in alignment with one of the detectors and another of the segments in alignment with the other of the detectors.

27. The system according to claim 26 in which the light source is a light emitting diode.

28. A sensor for determining the position of a target comprising:

(a) a source of light that emits light along an optical path;

(b) at least two light detectors;

(c) a sinusoidal pattern positioned between said light source and a periodic refelection profile, wherein said periodic reflection profile is located on a surface, wherein said optical path is defined from the source of light through the sinusoidal pattern and further reflecting off the periodic reflection profile to the light detectors.

29. The position sensor according to claim 28 wherein the sinusoidal pattern is installed directly to the light source and detectors so that light passes through the sinusoidal pattern twice before being detected.

30. The position sensor according to claim 29 wherein the sinusoidal pattern consists of a plurality of segments of the same frequency that are out of spatial phase with one another.

31. The position sensor according to claim 30 wherein the light source is a light emitting diode.

32. The position sensor according to claim 28 wherein the sinusoidal pattern consists of a plurality of segments of the same frequency that are out of spatial phase with one another.

33. The position sensor according to claim 32 wherein the light source is a light emitting diode.

34. The position sensor according to claim 28 wherein the light source is a light emitting diode.

\* \* \* \* \*